United States Patent [19]

Ichiyanagi

[11] 4,148,570
[45] Apr. 10, 1979

[54] MOTOR CONTROL DEVICE FOR SOUND MOTION PICTURE CAMERA

[75] Inventor: Toshikazu Ichiyanagi, Tokyo, Japan

[73] Assignee: Canon Kabushiki Kaisha, Tokyo, Japan

[21] Appl. No.: 822,252

[22] Filed: Aug. 5, 1977

[30] Foreign Application Priority Data

Aug. 13, 1976 [JP] Japan .................................. 51/96772

[51] Int. Cl.² ........................................... G03B 21/48
[52] U.S. Cl. ..................................... 352/180; 352/29; 352/30
[58] Field of Search ...................... 352/14, 27, 29, 30, 352/180

[56] References Cited

U.S. PATENT DOCUMENTS

| | | | |
|---|---|---|---|
| 3,825,329 | 7/1974 | Heinrich et al. | 352/180 |
| 3,942,882 | 3/1976 | Saito | 352/14 |
| 3,957,363 | 5/1976 | Hayashi et al. | 352/27 |
| 4,003,643 | 1/1977 | Freudenschuss et al. | 352/14 |
| 4,021,104 | 5/1977 | Ito | 352/14 |

*Primary Examiner*—Russell E. Adams
*Attorney, Agent, or Firm*—Toren, McGeady and Stanger

[57] ABSTRACT

In a sound motion picture camera of the type adapted for selective use of a sound magazine and a silent magazine and having separate drives for intermittent advancement and constant-speed transport of the film respectively on an exposure station and a sound recording station, the speed of rotation of a motor for the intermittent film drive is adjusted in accordance with the preselected value of picture frame speed when the used magazine is of the silent type, and varied as taking either of two discrete values faster and slower than the normal picture frame speed, depending upon whether a slack loop of the film formed between the exposure station and the sound recording station is decreased or increased from the predetermined length thereof, when the used magazine is of the sound type.

4 Claims, 4 Drawing Figures

MOTOR CONTROL DEVICE FOR SOUND MOTION PICTURE CAMERA

BACKGROUND OF THE INVENTION

In the sound motion picture camera for use with a cartridge type sound magazine there are provided a film motor for driving film and the like and a capstan motor for continuously driving the film at a constant speed past a sound recording station in combination with a drive control circuit for actuation, release and rotation of these motors. The film motor drives mechanisms for film winding up, rotation of a shutter disc and intermittent advancement of the film frame-by-frame, while the capstan motor is used to continuously rotate a capstan, pinch roller and the like by which a sound track on the film is passed at a constant speed in contact with a sound recording head in the sound recording position of the magazine. These motors are actuated and released by manipulation of a common switch almost simultaneously.

In making sound-accompanied picture taking exposure sequences with a sound magazine loaded in the camera, as the position of an aperture for taking pictures is different from the position of the sound head for sound recordings by a separation of a certain number of frames, and the film must be advanced intermittently in the picture taking station but continuously in the sound recording station, there is need to provide a certain amount of slack loop of the film between these stations.

In the conventional motor control device for the sound motion picture camera, the amount of slack loop of the film between the aperture position for taking motion picture and the sound recording head contact position was adjusted by On-Off control of the motor driving.

However, as the field of application and the performance of the motion picture camera are increased, the motor control device is required to have functions such as of selectively controlling the frame speed while still maintaining unchanged the amount of slack loop of the film necessary when the frame speed is changed, and of operating the camera with either one of the sound cartridge and silent cartridge.

SUMMARY OF THE INVENTION

An object of the present invention is to control the speed of rotation of the motor in response to detection of the amount of slack loop of the film and the speed of rotation of the motor so as to maintain the constant amount of loop of the film.

Another object of the present invention is to maintain the constant amount of slack loop of the film by controlling the speed of rotation of the film motor based on the amount of film transported by the capstan motor.

Still another object of the present invention is to provide a motor control device for a sound motion picture camera capable of accommodation for either of a sound cartridge and a silent cartridge.

A further object of the present invention is to provide a motor control device which makes it possible to perform normal sound-accompanied picture taking sequences even when the taking of pictures is performed with change in frame speed.

Other objects of the present invention will be understood in more detail from the following detailed description of the invention taken in conjunction with the accompanying drawings in which:

DETAILED DESCRIPTION OF THE PREFERRED EMBODIMENT

Figure 1:
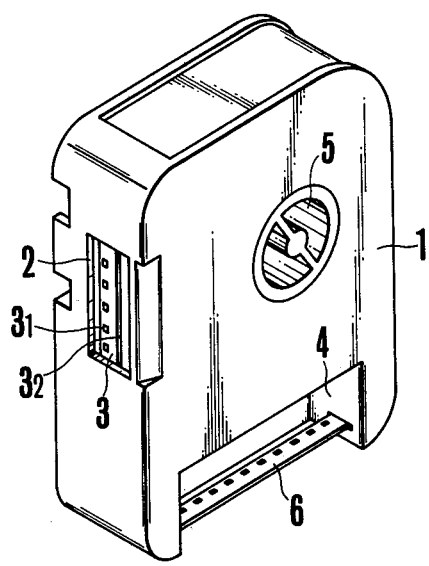
FIG. 1 is a perspective view of a sound cartridge.

FIG. 1 shows a super 8 sound cartridge as an example of the sound cartridge having a pair of side panels 1, an aperture abutment 2 (exposure station) a cutout 4 for receiving a sound recording mechanism and a film takeup spool 5, A photographic film strip 3 having perforations $3_1$ and a magnetic track $3_2$ is arranged to travel past the exposure aperture 2 and the sound recording station space 4 to the takeup spool 5. The location at which a film spool detecting mechanism is positioned is indicated at 6.

Figure 2:
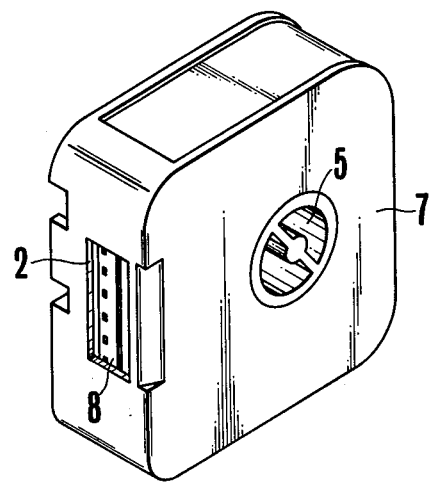
FIG. 2 is a perspective view of a silent cartridge.

FIG. 2 shows an example of a silent cartridge which lacks a cutout corresponding to that of FIG. 1 and of which the housing 7 is shortened in the vertical direction as compared with the magazine of FIG. 1 so that no mechanical interference between the magazine housing 7 and the sound recording mechanism occurs when this silent magazine is used in a sound motion picture camera.

Figure 3:
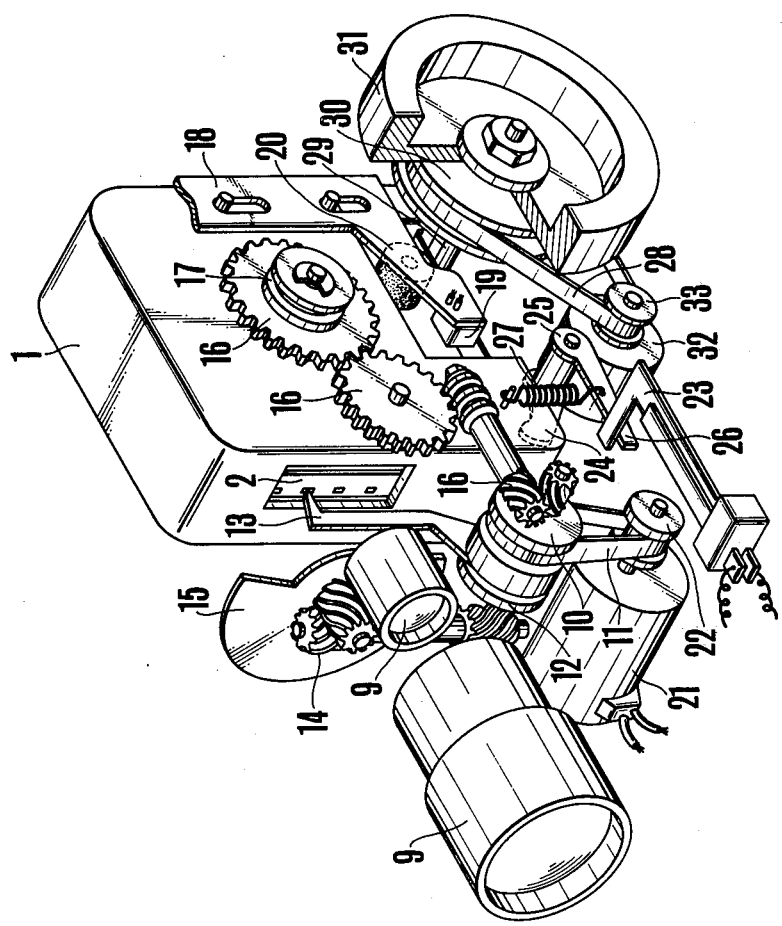
FIG. 3 is a perspective view of a sound motion picture camera without a housing thereof and the sound cartridge of FIG. 1 mounted therein.

FIG. 3 shows the basic parts of a sound motion picture camera employing one form of the present invention in an operative position where the sound cartridge of FIG. 1 is rendered effective. In front of the cartridge 1, there is shown an objective lens 9 by which a beam of light forming an image of a scene to be photographed is projected through the exposure aperture 2 onto the film 3. The camera further includes a first motor 21 for the film 3 with its output shaft fixedly carrying a pulley 22 for an endless drive belt 11. Motion of the first motor 21 is transmitted through the belt 11 to a pulley 10 fixedly mounted on a common shaft for a rotary member 12 of a pull-down claw 13, a drive gear 14 of a shutter blade 15 and a gear train 16 of a takeup spool 17. The operation of these mechanisms is well known in the art, and therefore its explanation is omitted.

A second motor 32 is provided to transport the film 3 past a sound recording station where a sound recording head 19 mounted on a vertically slidable support 18 is acted on a magnetic track of the film 3, and a pinch roller 20 made of rubber urges the film 3 to driving contact against a capstan 29 which is connected to the output shaft of the motor 32 through an endless belt 28 trained between two pulleys 30 and 33 of the capstan shaft and the output shaft of the motor 32 respectively, thereby the film 3 is transported at a constant speed. A flywheel 31 is fixedly mounted on the capstan shaft.

A film slack loop detecting mechanism includes a resilient arm 24 extending transversely of the film path and arranged forwardly of the sound head 19 to detect a slack loop of the film between the exposure station and the sound recording station. The arm 24 is pivoted about a shaft 25 and connected to a lever 26 which is biased upwardly by a spring 27 to urge the arm 24 toward the lower surface of the film 3 and which extends into the path of movement of a movable contact of a switch 23 so that when the slack loop is increased to push down the detecting arm 24, the switch 23 is opened.

Figure 4:
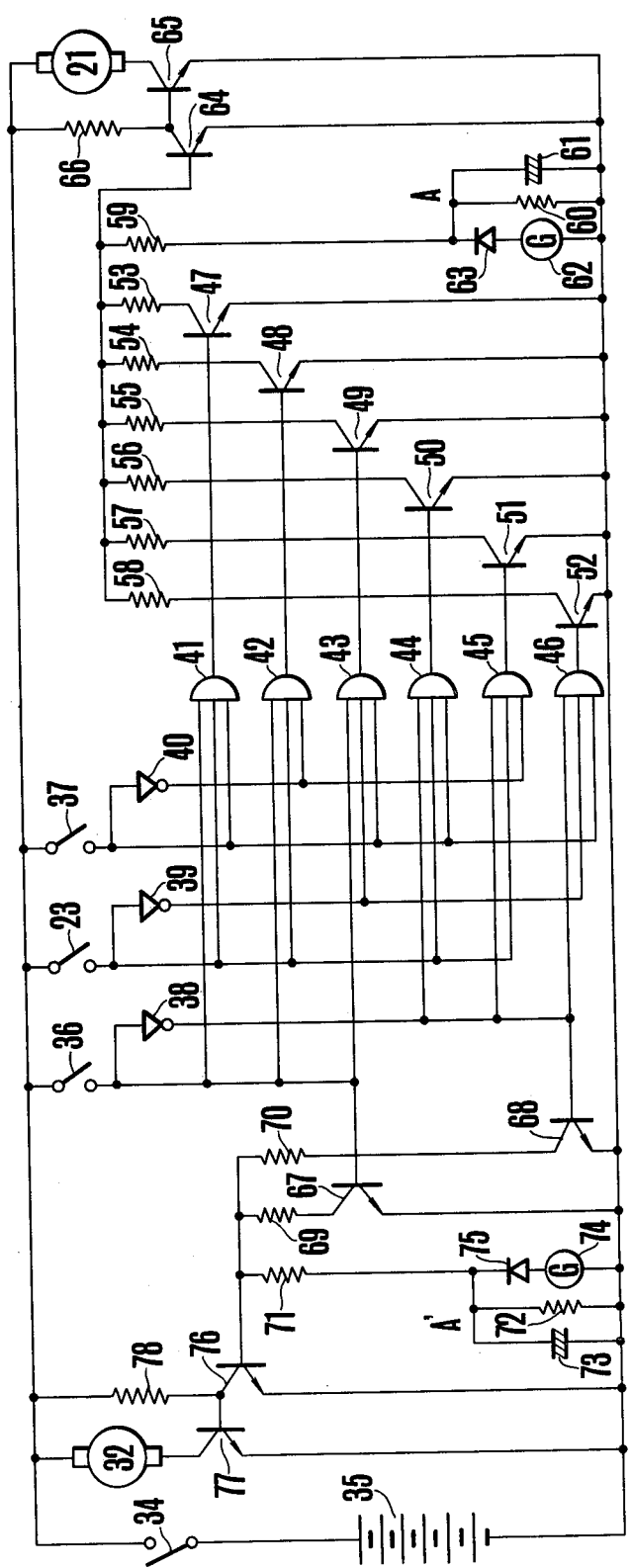
FIG. 4 is an electrical circuit diagram of one embodiment of a motor control device according to the present invention.

Referring now to FIG. 4, one embodiment of a speed control circuit for a sound motion picture camera of the type described according to the invention comprises first and second drive circuits for the film motor 21 and capstan motor 32 respectively, first and second tachometers cooperative with the respective motors 21 and 32 for generating A.C. signals each of which after rectified to produce a D.C. voltage is applied to a voltage divider, and a logic circuit responsive to three switches 36, 23 and 37 in combination for controlling the output of the one of the two voltage dividers on which the speed of rotation of the film motor 21 depends, while the output of the other voltage divider for the capstan motor 32 is dependent upon the switched position of the third switch 36.

The first drive circuit includes a first transistor 64 having a base connected to the output of the voltage divider, having an emitter connected to the negative terminal of an electrical power source or battery 35 and having a collector connected through a resistor 66 and through a main switch 34 to the positive terminal of the battery 35, and a second transistor 65 having a base connected to the collector of the first transistor 64, having an emitter connected to the negative terminal of the battery 35 and having a collector connected to a winding of the film motor 21 at one end thereof, the opposite end of which is connected to the positive bus. The first tacho-generator 62 is coupled to the rotating shaft of the motor 21 to generate an A.C. signal which is a function of the actual motor speed and which is rectified by a diode 63 to produce a D.C. voltage which is applied to a voltage divider comprised of a fixed resistor 59 and one of a plurality of resistors 53 to 58 which is selected by the logic circuit. Connected between the cathode of the diode 63 and the negative bus are a resistor 60 for adjustment of the output of the tacho-generator 62 and the first condenser 61 connected in parallel with each other. If this tacho-generator 62 is replaced by a D.C. tacho-generator, the rectifying diode 63 and the first condenser 61 may be omitted.

The second drive circuit includes a third transistor 76 having a base connected to the output of the second voltage divider, having an emitter connected to the negative terminal of the battery 35 and having a collector connected through a resistor 78 and through the main switch 34 to the positive terminal of the battery 35, and a fourth transistor 77 having a base connected to the collector of the third transistor 76, having an emitter connected to the negative terminal of the battery 35 and having a collector connected to a winding of the capstan motor 32 at one end thereof, the opposite end of which is connected to the positive terminal of the battery 35 through the switch 34. The second tacho-generator 74 is coupled to the rotating shaft of the motor 32 to generate an A.C. signal which is rectified by a diode 75 to produce a D.C. voltage which is applied to the second voltage divider composed of a fixed resistor 71 and the one of resistors 69 and 70 which is selected by the third switch 36. The rectifying diode 75 is biased by an adjusting resistor 72 and the second condenser 73 connected in parallel with each other. If this tacho-generator 74 is replaced by a D.C. tacho-generator, the diode 75 and the second condenser 73 may be omitted.

To selectively connect either one of the resistors 69 and 70 in series with the resistor 71, there are provided two transistors 67 and 68 having collectors connected to the respective resistors 69 and 70, having emitters connected to the negative bus and having bases connected to the third switch 36 directly and through a Not circuit 38 respectively. This third switch 36 is arranged to be manually operable between a closed position for a film speed of 18 frames/sec. and an open position for 24 frames/sec.

The logic circuit includes six AND circuits 41 to 46 each having three input terminals connected to the respective switches 36, 23 and 27 either directly or through respective Not circuits 38, 39 and 40 and having one output terminals connected to respective bases of NPN type transistors 47 to 52 with their emitters connected to the common negative bus and with their collectors connected to respective resistors 53 to 58 and therefrom connected by way of a common lead to the base of the transistor 64 of the drive circuit.

The operation of the motor control circuit of FIG. 4 is next explained. When the main switch 34 is closed, a base current is caused to flow through the resistor 66 to the transistor 65, so that the film motor 21 start to rotate along with the tacho-generator 62. The potential $V_A$ at a point A may be expressed as:

$$V_A = K \cdot n$$

wherein K is constant; and n is the number of revolutions of the film motor 21. As the output voltage $V_A$ of the tacho-generator 62 is divided by the resistance value R59 of the resistor 59 and a resistance value Rx of the selected one of the resistor 53 to 58, this divided voltage $V_B$ may be expressed as:

$$V_B = \frac{Rx}{Rx + R59} V_A = \frac{Rx}{Rx + R59} Kn$$

When $V_B > 0.6$ volt, the first transistor 64 is in a conducting state, while the second transistor 65 is in a non-conducting state, thereby no current is allowed to flow through the winding of the motor 21 with the resulting speed of rotation of the motor 21 being decreased with decrease in the output voltage $V_A$ of the tacho-generator 62. When $V_B < 0.6$ volt, the first transistor 64 is rendered non-conducting, while the second transistor 65 is rendered conducting to energize the motor 21. As the speed of rotation of the motor 21 is increased, the output voltage $V_A$ of the tacho-generator 62 is increased with increase in the divided voltage $V_B$. Upon attainment to stabilization of the motor speed control, the divided voltage $V_B$ is maintained at about 0.6 volt. Therefore, the number of revolutions of the film motor 21 is adjusted to a value defined by the following formula:

$$n = \frac{0.6(Rx + R59)}{K \cdot Rx} = \frac{0.6}{K} + \frac{0.6}{K} \cdot \frac{R59}{Rx}.$$

Thus, it is possible to vary the adjusted number of revolutions of the film motor 21 by varying the resistance value Rx with selection of any one of the resistors R53 to R58.

The speed control of the capstan motor 32 for constant-speed film drive can be performed in synchronism with that of the film motor 21 provided that the design parameters of the first and second drive circuits are identical to each other. In this connection, it is to be noted that the resistors 69 and 70 correspond to the resistors 54 and 57.

When the frame speed selector switch 36 is closed, the transistor 67 is rendered conducting with the resulting frame speed being 18 frames/sec. Upon opening of the switch 36, a high level voltage signal is produced from the Not circuit 38, causing conduction of the transistor 68 with the resulting frame speed being 24 frames/sec.

The six AND gates 41 to 46 are selectively gated on to render one of the six transistors 47 to 52 conducting depending upon the corresponding one of the combinations of the switched positions of the first or film slack loop detecting switch 23, the second or magazine type detecting switch 37 and the third or frame speed selecting switch 36 as summarized in Table 1 below:

Table 1

| SW36 | SW23 | SW37 | 47 | 48 | 49 | 50 | 51 | 52 | 67 | 68 |
|------|------|------|----|----|----|----|----|----|----|----|
| OFF  | OFF  | ON   | —  | —  | —  | —  | —  | ON | —  | ON |
| OFF  | ON   | OFF  | —  | —  | —  | —  | ON | —  | —  | ON |
| OFF  | ON   | ON   | —  | —  | —  | ON | —  | —  | —  | ON |
| ON   | OFF  | ON   | —  | —  | ON | —  | —  | —  | ON | —  |
| ON   | ON   | OFF  | —  | ON | —  | —  | —  | —  | ON | —  |
| ON   | ON   | ON   | ON | —  | —  | —  | —  | —  | ON | —  |

Note: Symbol, —, represents the open position or non-conducting state.

The predetermined speed of rotation of the film motor 21 depends upon the combination of the switched positions of the first, second and third switches with selection of one of the resistors 53 to 58 as summarized in Table 2 below.

Table 2

| SW36 | SW23 | SW37 | Speed of Motor 21 |
|------|------|------|-------------------|
| OFF  | OFF  | ON   | 26 frames/sec.    |
| OFF  | ON   | OFF  | 24                |
| OFF  | ON   | ON   | 22                |
| ON   | OFF  | ON   | 20                |
| ON   | ON   | OFF  | 18                |
| ON   | ON   | ON   | 16                |

When a silent cartridge is loaded into a cartridge receiving chamber within the camera housing not shown, the second switch 37 is automatically opened, while the first switch 23 is permitted to remain in the closed position. Further when the frame speed switch 36 is opened, the AND circuit 45 is gated on and the transistor 51 is actuated for conduction with selection of the resistor 57 so that the film motor 21 is driven for rotation at a speed corresponding to a frame speed of 24 frames/sec.

With the silent cartridge loaded, when the frame speed switch 36 is closed, the AND circuit 42 is acted on instead of the AND circuit 45, and the transistor 48 is rendered conducting, while the transistor 51 is rendered non-conducting, so that the resistor 54 is selected instead of the resistor 57, causing the speed of the film motor 21 to take on a value corresponding to 18 frames/sec.

When a sound cartridge is loaded into the chamber, and when the frame speed switch 36 is opened to select 24 frames/sec., the transistor 68 is rendered conducting to select the resistor 70 for cooperation with the second drive circuit for the capstan motor 32. When the actual length of a slack loop of the film as detected by the detecting arm 24 of FIG. 3 is shorter than the predetermined length, the first switch 23 is in the closed position. As a result, the AND circuit 46 is gated on, and the transistor 52 is rendered conducting so that the speed of the film motor 21 is adjusted to 26 frames/sec. This faster speed of the film motor 21 than that of the capstan motor 32 leads to increases in the length of the slack loop of the film. When the actual length of the film slack loop has reached the predetermined length, the first switch 23 is opened, thereby the AND circuit 44 is acted on and the transistor 50 is rendered conducting to select the resistor 56 by which the speed of the film motor 21 is adjusted to 22 frames/sec. In a short time interval, the actual length of the film slack loop falls below the predetermined length with simultaneous occurrence of closure of the first switch 23.

With the sound cartridge loaded, when the frame speed switch is set to the position for 18 frames/sec., the transistor 67 is rendered conducting to select the resistor 69 by which the speed of the capstan motor 32 is adjusted to 18 frames/sec. When the actual length of the film slack loop in the cutout 4 for the sounding recording station is shorter than the predetermined length, the first switch 23 is closed, thereby the AND circuit 43 is acted on and the transistor 49 is rendered conducting to select the resistor 55 by which the speed of the film motor 21 is adjusted to 20 frames/sec.

As the length of the film slack loop is increased to the predetermined length, the first switch 23 is opened, thereby the AND circuit 41 is acted on and the transistor 47 is rendered conducting to select the resistor 53 by which the speed of the film motor 21 is adjusted to 16 frames/sec.

It will be seen from the foregoing that the present invention provides a motor control device capable of selective speed control of intermittent and constant-speed film drives between common two frame speeds of 18 and 24 frames/sec. by the frame speed selecting switch 36 and further capable of varying the speed of rotation of a separate motor for the intermittent film drive in accordance with the output of the logic circuit depending upon the particular combination of the switched positions of the frame speed selecting switch 36, the cartridge type responsive switch 37 and the film slack loop responsive switch 23. This is done while still maintaining the speed of the capstan motor at the constant normal level. Thus, it is possible to achieve accurate control of sound-accompanied motion picture taking operation at any one of two available frame speeds.

What is claimed is:

1. A motor control circuit for a sound motion picture camera comprising:
    (a) a film motor for intermittent film drive and a first drive circuit for controlling the speed of rotation of said motor;
    (b) a capstan motor for constant-speed film drive and a second drive circuit for controlling the speed of rotation of said motor;
    (c) a first switch means arranged to be turned on and off depending upon the length of a slack loop of the film;
    (d) a second switch means arranged to be turned on and off depending upon the type of a film magazine used;
    (e) a third switch means for controlling operation of said second drive circuit to change the speed of rotation of said capstan motor;

(f) first control means for controlling the rotation speed of the film motor, said means being connected to said first drive circuit to change the output of said first drive circuit in correspondence to the open or closed state of the first, second and third switch means and thereby to control the speed of the film motor; and (g) a logic circuit for controlling said first control circuit means, said logic circuit including an inverter which provides as an output a signal in correspondence to the open or closed state of the three switch means, and an AND circuit for supplying the signal corresponding to the open or closed state of the three switch means to control the output of the first control circuit means corresponding to the open or closed state of each switch means.

2. A motor control circuit according to claim 1, in which the first control circuit means is a voltage divider having a plurality of resistors and controls the first drive circuit in accordance with the logic control of the logic circuit.

3. A motor control circuit for a sound motion picture camera comprising:

(a) a film motor for intermittent film drive and a first drive circuit for controlling the speed of rotation of said motor;

(b) a capstan motor for constant-speed film drive and a second drive circuit for controlling the speed of rotation of said motor;

(c) a first switch means arranged to be turned on and off depending upon the length of a slack loop of the film;

(d) a second switch means arranged to be turned on and off depending upon the type of a film magazine;

(e) a third switch means for controlling operation of said second drive circuit to change the speed of rotation of said capstan motor;

(f) first control circuit means for controlling the rotation speed of the film motor, said means being connected to said first drive circuit to change the output of said first drive circuit in correspondence to the open or closed state of the first, second and third switch means and thereby to control the speed of the film motor;

(g) a logic circuit including an inverter which provides as an output a signal in correspondence to the open or closed state of the three switch means, and an AND circuit for supplying the signal corresponding to the open or closed state of the three switch means to control the output of the first control circuit means corresponding to the open or closed state of each switch means; and (h) second control circuit means for change-over and control of the film drive speed of the capstan motor, said means being connected to the second drive circuit to change the output of the second drive circuit in correspondence to the open or closed state of the third switch means caused by selection of the film drive speed and to control the speed of the capstan motor.

4. A motor control circuit according to claim 3, in which the second control circuit means is a voltage divider having a plurality of resistors.

* * * * *